US011859799B2

(12) United States Patent
Leathlean

(10) Patent No.: US 11,859,799 B2
(45) Date of Patent: Jan. 2, 2024

(54) FIXTURE CONNECTION ASSEMBLY

(71) Applicant: Barn Light Electric Company, LLC, Titusville, FL (US)

(72) Inventor: Mark Lee Leathlean, Titusville, FL (US)

(73) Assignee: Barn Light Electric Company, LLC, Titusville, FL (US)

( * ) Notice: Subject to any disclaimer, the term of this patent is extended or adjusted under 35 U.S.C. 154(b) by 0 days.

(21) Appl. No.: 17/627,318

(22) PCT Filed: Jul. 7, 2020

(86) PCT No.: PCT/US2020/041083
§ 371 (c)(1),
(2) Date: Jan. 14, 2022

(87) PCT Pub. No.: WO2021/011243
PCT Pub. Date: Jan. 21, 2021

(65) Prior Publication Data
US 2022/0316691 A1 Oct. 6, 2022

Related U.S. Application Data

(60) Provisional application No. 62/874,644, filed on Jul. 16, 2019.

(51) Int. Cl.
*F21V 21/112* (2006.01)
*F21V 17/12* (2006.01)

(52) U.S. Cl.
CPC ............ *F21V 21/112* (2013.01); *F21V 17/12* (2013.01)

(58) Field of Classification Search
CPC ...... F21V 17/12; F21V 21/112; F21V 31/005; F21S 8/063
See application file for complete search history.

(56) References Cited

U.S. PATENT DOCUMENTS 2,284,955 A * 6/1942 Francis .................. F21V 21/22 362/408
2,446,736 A * 8/1948 Biller ...................... F21V 21/03 174/64
2,736,528 A * 2/1956 Le Brock ................ F21V 21/00 362/404
2,762,598 A * 9/1956 Runge .................. F21V 21/112 248/327

(Continued)

FOREIGN PATENT DOCUMENTS

CN 103185251 9/2016

OTHER PUBLICATIONS

International Search Report and Written Opinion, PCT/US2020/041083, dated Sep. 30, 2020.

*Primary Examiner* — Zheng Song
(74) *Attorney, Agent, or Firm* — Akerman LLP

(57) ABSTRACT

A light fixture connection assembly includes an internally threaded stem and two connectors that couple with a top surface and a bottom surface of a light fixture shade. Bores throughout the stem and connectors define a passageway for electrical wiring connected to a light sourced within the light fixture shade. The connection assembly reduces water-leakage into the hollow passage, and prevents electrical hazards and premature termination of the useable life of the light fixture.

14 Claims, 16 Drawing Sheets

(56) References Cited

U.S. PATENT DOCUMENTS

| | | | | | |
|---|---|---|---|---|---|
| 2,916,249 | A * | 12/1959 | Wolar | F21V 21/112 | 248/342 |
| 2,951,716 | A * | 9/1960 | Myers | F21V 21/30 | 248/342 |
| 5,791,768 | A * | 8/1998 | Splane, Jr. | F21V 17/02 | 362/345 |
| 5,941,631 | A * | 8/1999 | Hsu | F21S 8/065 | 362/454 |
| 6,273,590 | B1 * | 8/2001 | Splane, Jr. | F21V 17/02 | 362/346 |
| 6,761,342 | B1 * | 7/2004 | Giefer | F21S 8/061 | 362/403 |
| 9,068,725 | B1 | 6/2015 | Kuykendall et al. | | |
| 2004/0190301 | A1 | 9/2004 | Blateri | | |
| 2016/0109101 | A1 | 4/2016 | Ohai | | |
| 2017/0175793 | A1 | 6/2017 | Leathlean | | |
| 2023/0085297 | A1 * | 3/2023 | Liu | F21V 21/104 | 362/276 |

* cited by examiner

FIXTURE CONNECTION ASSEMBLY

CROSS-REFERENCE TO RELATED APPLICATIONS

This non-provisional patent application is a § 371 national phase of PCT/US2020/041083, filed Jul. 7, 2020, which claims priority to U.S. Provisional Patent Application No. 62/874,644, filed Jul. 16, 2019 both of which are incorporated herein by reference in their entirety.

FIELD OF THE DISCLOSURE

This disclosure relates generally to light fixtures, and more particularly to light fixture connection assemblies including a set of couplers for mounting a light shade on a post or stem.

BACKGROUND

Outdoor light fixture shades are commonly used to protect light bulbs from environmental elements, including rainwater. A light shade is typically attached to a light fixture connection assembly using conventional metal fasteners that screw onto the exterior surface of a threaded post, which houses the electrical wiring for the light fixture. The fasteners commonly employ two threaded nuts: one engaging an exterior surface of the light fixture shade, and the other engaging an interior surface of the light fixture shade.

The fasteners hold the light fixture shade onto the post of the connection assembly. However, in outdoor applications, as well as indoor applications with high humidity, the fasteners may not protect the electrical wiring of the light fixture from water-leakage. Exposure of electrical wiring to water creates an electrical hazard. Progressive water damage to the circuitry may reduce the operating lifetime of the light fixture. Water exposure may also affect the surfaces of the light fixture. For example, rust may form on the surfaces of the light shade that adjoin to the components of the connection assembly. Damage may be exasperated in hanging light fixtures that do not provide a secure covering for the electrical wiring, as gravity in combination with other external forces may cause the connection assembly to loosen and open over time.

Features of the present disclosure overcome the foregoing and various other deficiencies of the prior art, providing light fixture connection assemblies that secure light fixture shades, reduce water-leakage, and protect electrical wiring.

BRIEF SUMMARY

Objectives of the present disclosure may include an improved light fixture connection assembly that more effectively secures a light fixture shade and protects the electrical wiring of the light fixture from water damage. In certain embodiments, the disclosed assembly may reduce water-leakage into the interior of the light fixture. Furthermore, an advantage of the disclosed connection assembly in some embodiments may include the mitigation of water damage to the electrical wiring in environments where external forces cannot be controlled.

In order to achieve the above-mentioned objectives, embodiments of the disclosed connection assemblies may include a stem with an internal threaded-stem segment and two connectors. One of the two connectors may contain an external threaded-connector segment that engages the internal threaded-stem segment of the stem. One connector may engage an exterior surface of a lighting shade, while another connector may engage an interior surface of the lighting shade. Bores that traverse the interiors of the stem and the connectors may allow electrical wiring to pass through and connect a light source to the light fixture shade.

In an embodiment, a light fixture connection assembly may include a stem, a bottom connector and a top connector that secure a light fixture shade. The stem may include a longitudinal stem-bore and an internal threaded segment within the bore. The internal threaded segment of the stem may engage an external threaded-connector segment of the bottom connector. The bottom connector may include a longitudinal connector-bore that traverses the entire axial length of the bottom connector. The bottom connector may pass through an aperture in a light fixture shade, and the external threaded-connector segment of the bottom connector may engage an internal threaded-connector segment of the top connector. A bottom ring on the bottom connector may couple with an interior surface of the light fixture shade, adjacent to the aperture in the light fixture shade. A top bottom side of the top connector may couple with an exterior surface of the light fixture shade, adjacent to the aperture in the light fixture shade.

In some embodiments, the longitudinal stem-bore of the stem and the longitudinal connector-bore of the bottom connector may define a hollow passage adapted to contain electrical wiring. The coupling between the top connector and the light fixture shade may form a seal that reduces water leakage. The light fixture shade may be configured to project light from a light source in a downward directly.

In certain embodiments, the top connector may be configured to engage the stem, and the bottom connector may be configured to engage the top connector. The top connector may couple with the exterior surface of the light fixture shade, and the bottom connector may couple with the interior surface of the light fixture shade. The connectors may each contain a hollow bore.

In some embodiments, the bores may create a hollow passage capable of housing electrical wiring when the internal threads of a stem engage the external threads of the top connector, which may include internal threads that engage the external threads of the bottom connector. Coupling of the top connector with the light fixture shade may create a seal to reduce water leakage.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

DETAILED DESCRIPTION

Figure 1B:
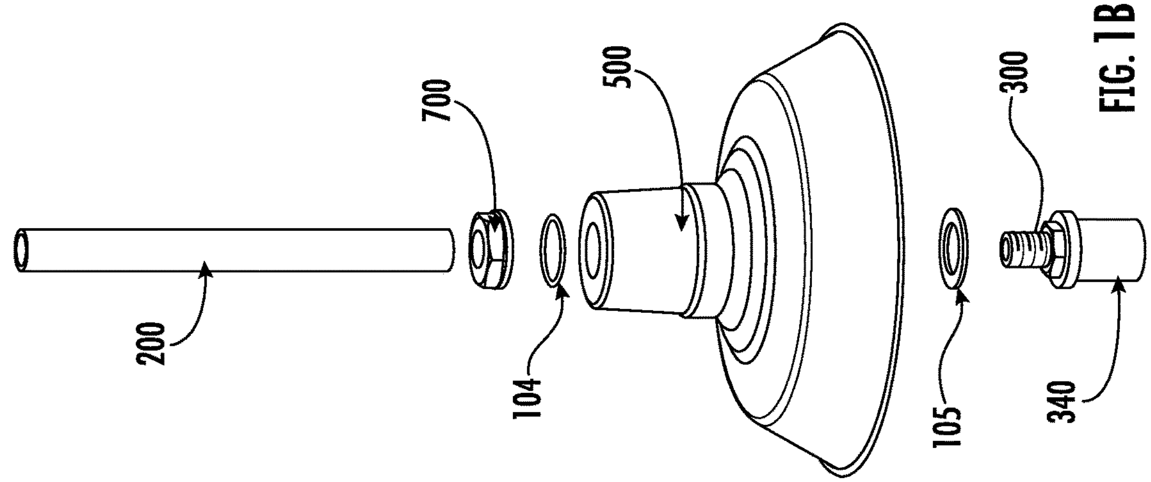
FIG. 1B is an exploded view of the connection assembly illustrated in FIG. 1A, in accordance with certain embodiments of the present disclosure.

Reference will now be made in detail to the embodiments of the present disclosure, examples of which are illustrated in the accompanying drawings.

Connection Assembly

With reference to FIGS. 1-7, the present disclosure may be embodied as a connection assembly 100 that includes a stem 200 and two connectors 300, 700. FIG. 1A illustrates a connection assembly 100 in an assembled state, which may comprise a downward facing light fixture 400 suspended from a ceiling (not shown) via the stem 200. In some embodiments, the two connectors 300, 700 constitute a bottom connector 300 and a top connector 700. As illustrated in FIGS. 1B-1C and 4B, at least one connector 300 may be configured to engage the stem 200. The two connectors 300, 700 may be configured to couple, directly or indirectly, to a light fixture shade 500.

Stem

Figure 2A:
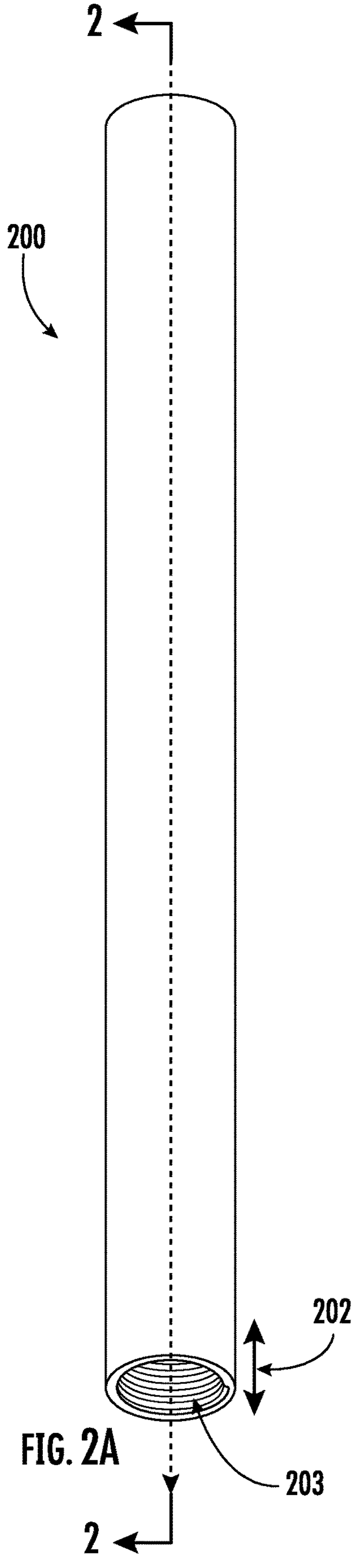
FIG. 2A is a perspective view of a stem component illustrating the threading on the interior surface of the stem, in accordance with certain embodiments of the present disclosure.
Figure 2B:
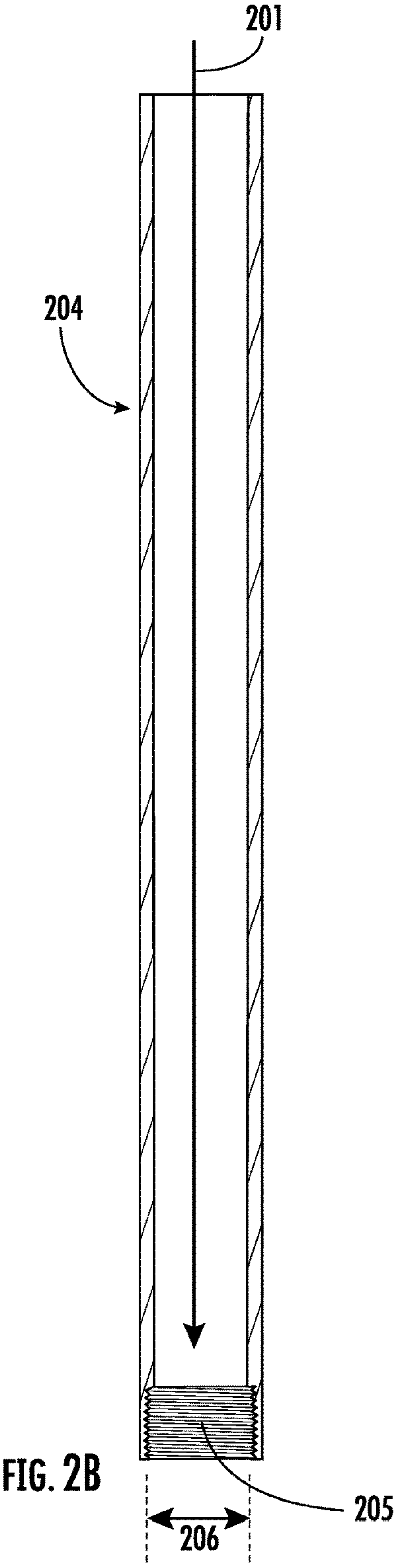
FIG. 2B is a cross-sectional view of the stem component illustrated in FIG. 2A taken along line 2+-+2, in accordance with certain embodiments of the present disclosure.

Referring to FIGS. 2A-2B, the stem 200 may contain a longitudinal stem-bore 201 and an end-portion 202. The end-portion 202 may define a stem-opening 203 that extends from the longitudinal stem-bore 201. The end-portion 202 of the stem 200 may comprise a cylindrical wall 204 with an internal threaded-stem segment 205. The internal threaded-stem segment 205 may have a single-thread diameter 206, and may traverse the end-portion 202 of the longitudinal stem-bore 201.

Bottom Connector

As shown in FIGS. 3A-3D, an embodiment may contain a bottom connector 300 comprising a top-end portion 302, a nut 320, and a bottom ring 330. The bottom connector 300 may comprise a longitudinal connector-bore 301, which may traverse an entire axial-length of the bottom connector 300. An external surface of the top-end portion 302 may comprise an external threaded-connector segment 310.

Figure 1A:
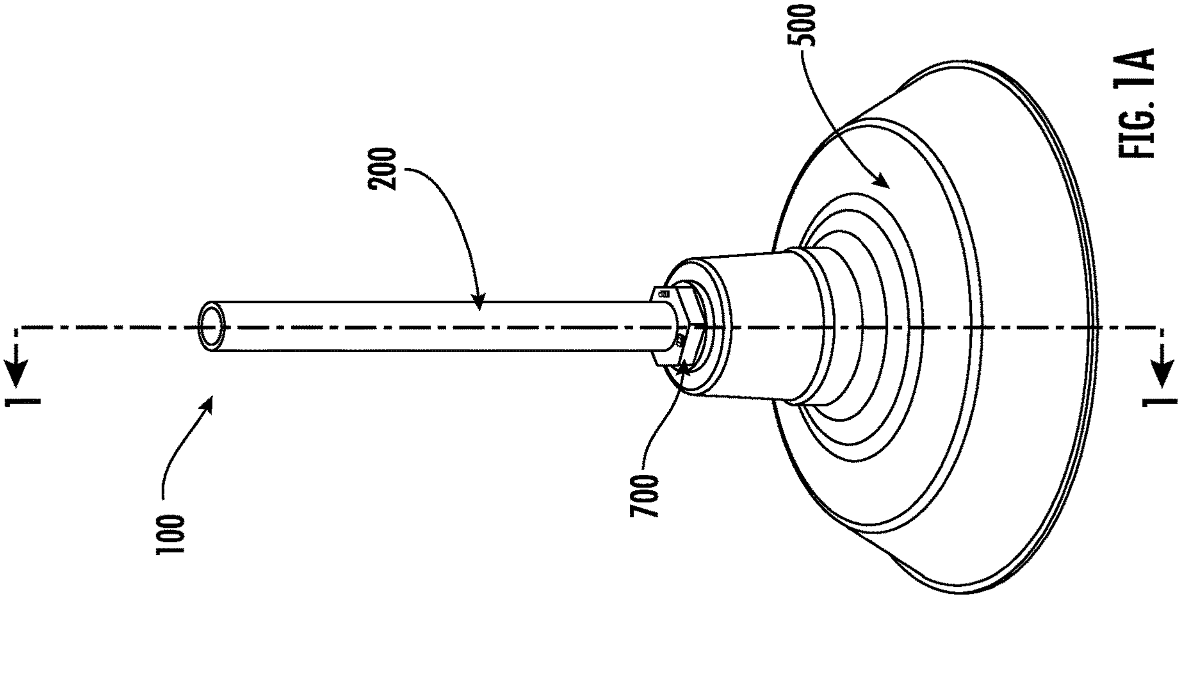
FIG. 1A is a perspective view of a connection assembly, in accordance with certain embodiments of the present disclosure.
Figure 1C:
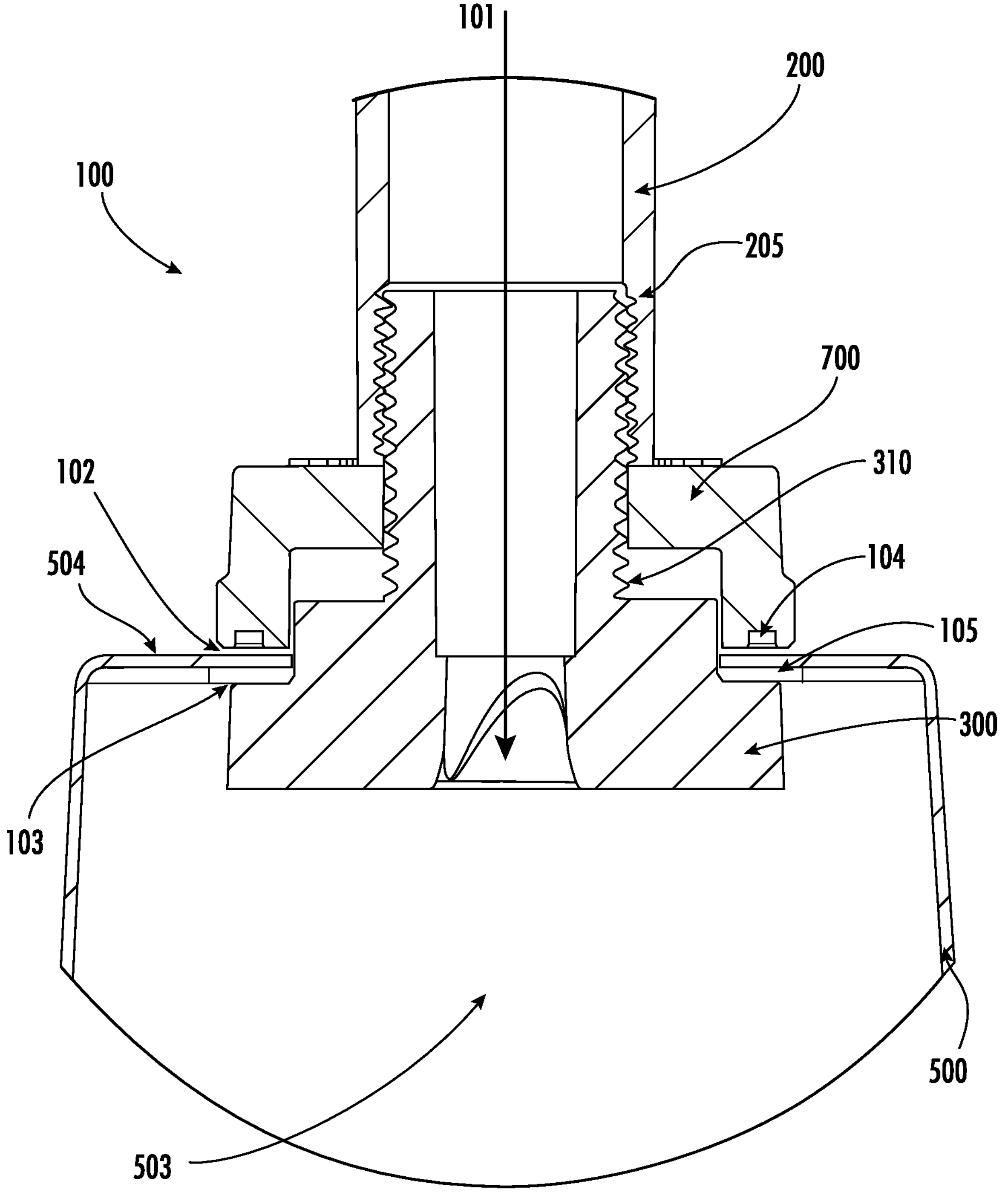
FIG. 1C is a cross-sectional view of a section of the connection assembly illustrated in FIG. 1A taken along line 1+-+1 showing the coupling of the stem and the connectors, in accordance with certain embodiments of the present disclosure.
Figure 3A:
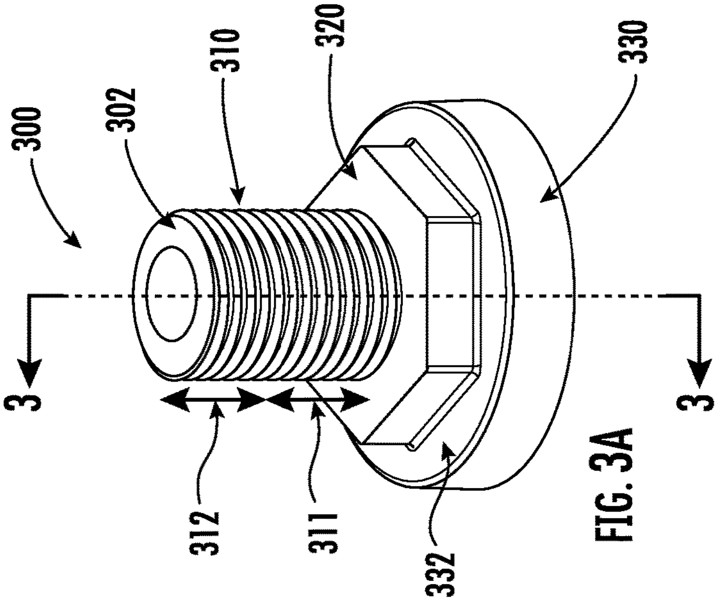
FIG. 3A is a perspective view of a bottom connector with an external threaded-connector segment that has a single diameter, in accordance with certain embodiments of the present disclosure.
Figure 3B:
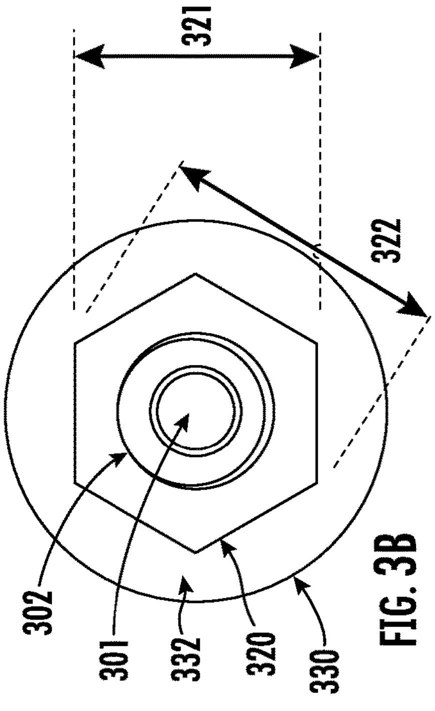
FIG. 3B is a top view of the bottom connector illustrated in FIG. 3A, in accordance with certain embodiments of the present disclosure.
Figure 3C:
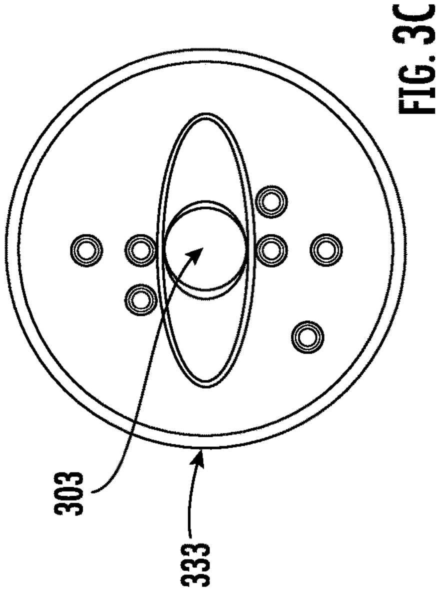
FIG. 3C is a bottom view of the bottom connector illustrated in FIG. 3A, in accordance with certain embodiments of the present disclosure.
Figure 3D:
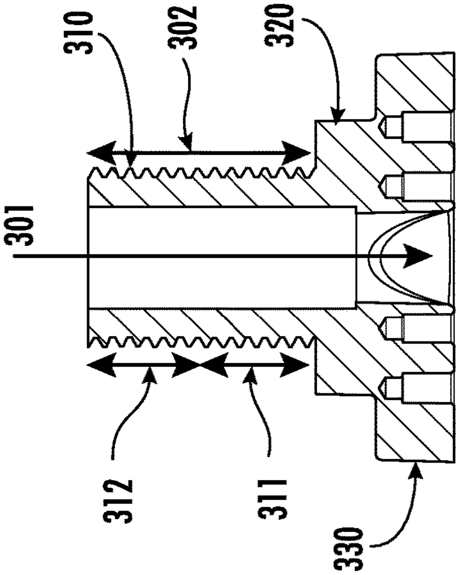
FIG. 3D is a cross-sectional view of the bottom connector illustrated in FIG. 3A taken along line 3+-+3, in accordance with certain embodiments of the present disclosure.

Referring back to FIG. 1C, the bottom connector 300 may be configured to engage the stem 200. The external threaded-connector segment 310 may be configured to engage the internal threaded-stem segment 205 of the stem 200. In some embodiments, the external threaded-connector segment 310 may comprise a bottom-segment 311 and a top-segment 312. As illustrated in FIGS. 3A and 3D, the bottom-segment 311 and the top-segment 312 may have the same diameter. This diameter may correspond to the single-thread diameter 206 of the internal threaded-stem segment 205 of the stem 200 to facilitate the engagement of the stem 200 with the top-segment 312 of the external threaded-connector segment 310 of the bottom connector 300, as shown in FIG. 1C. An internal threaded-connector segment 701 of a top connector 700, which is described in detail below, may be adapted to engage the bottom-segment 311 of the external threaded-connector segment 310 of the bottom connector 300.

Figure 4A:
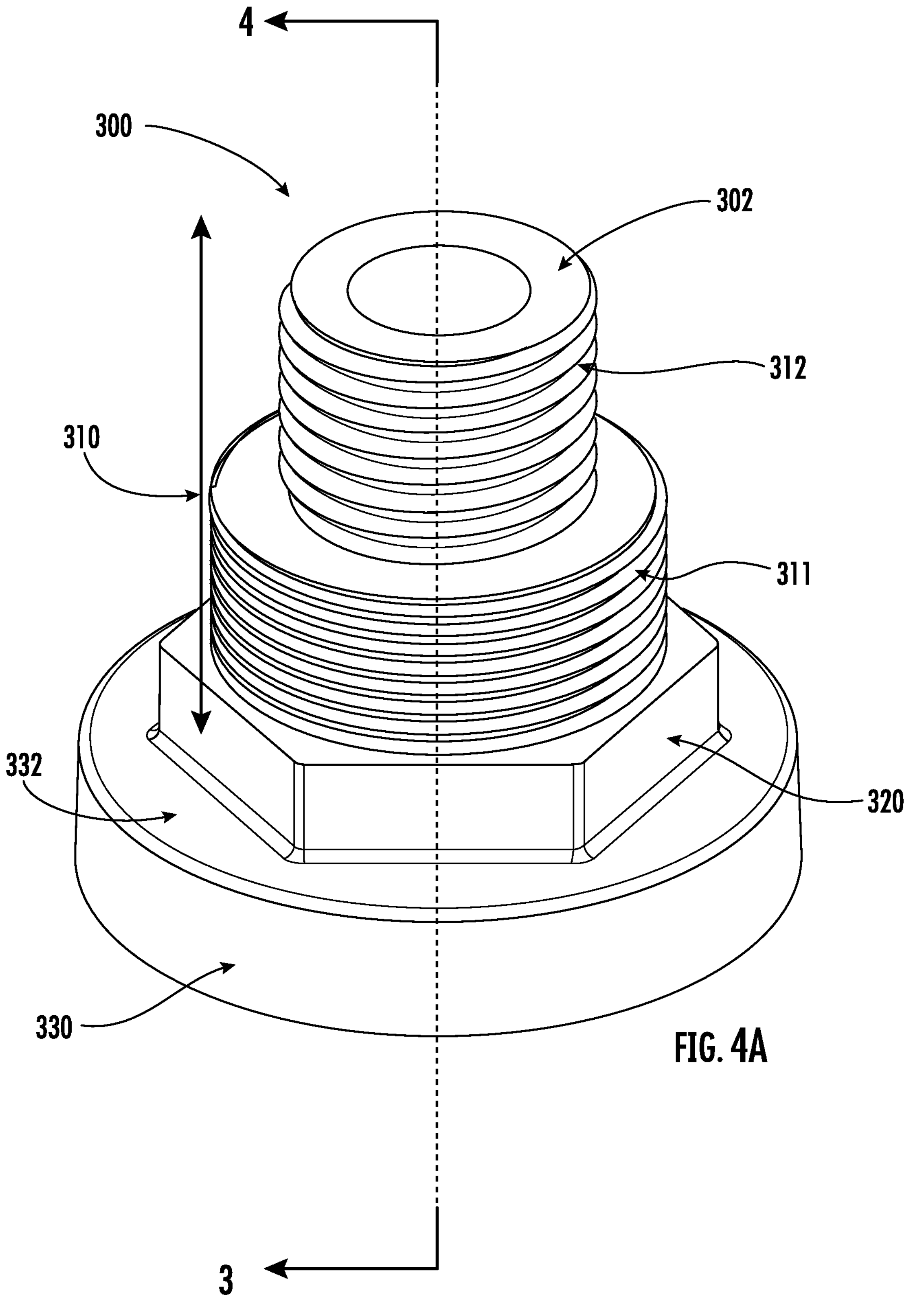
FIG. 4A is a perspective view of a bottom connector with an external threaded-connector segment having a top-segment and a bottom-segment that have different diameters, in accordance with certain embodiments of the present disclosure.
Figure 4B:
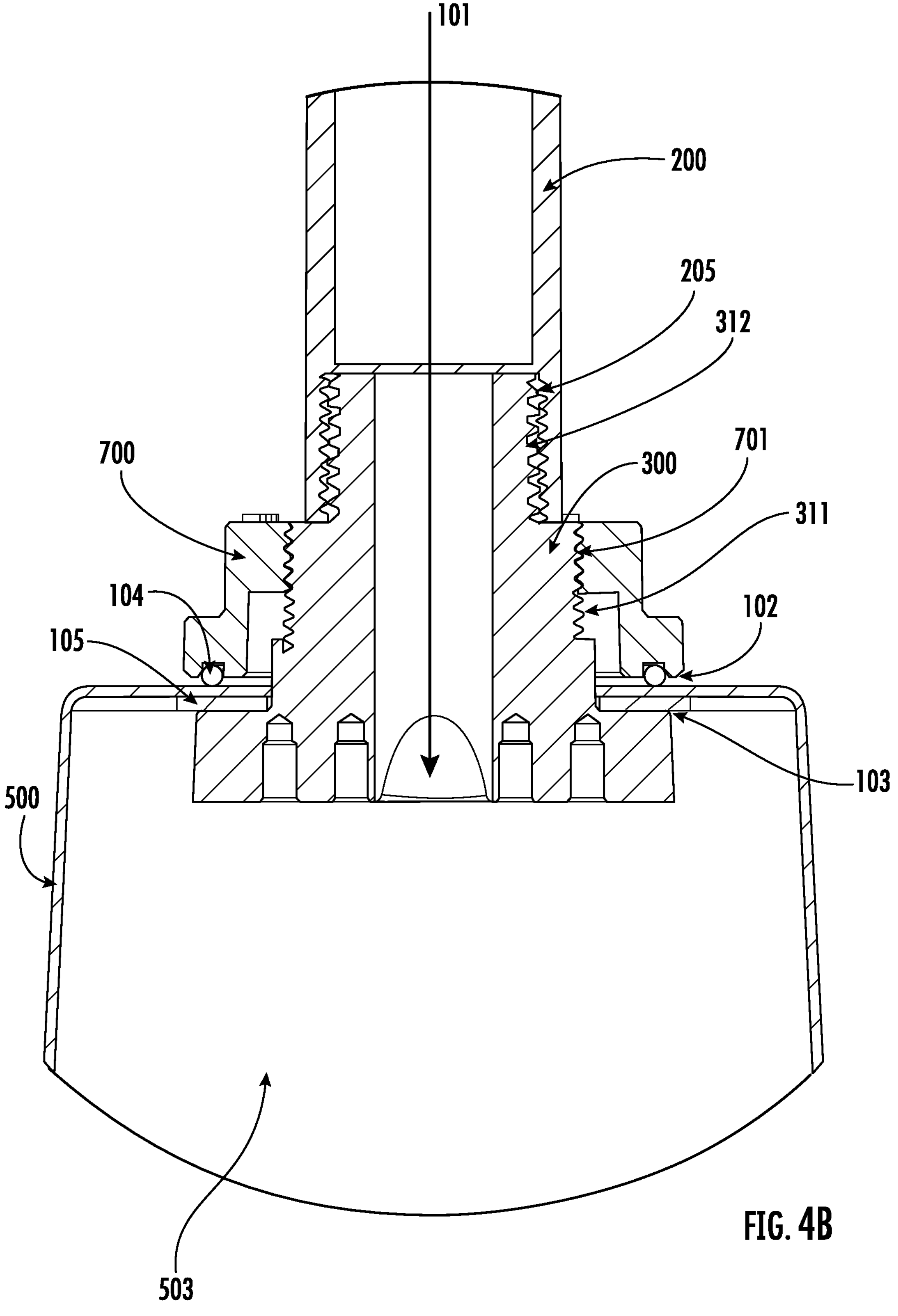
FIG. 4B is a cross-sectional view of a section of the connection assembly using the bottom connector illustrated in FIG. 4A showing the coupling of the stem and the connectors, in accordance with certain embodiments of the present disclosure.
Figure 4C:
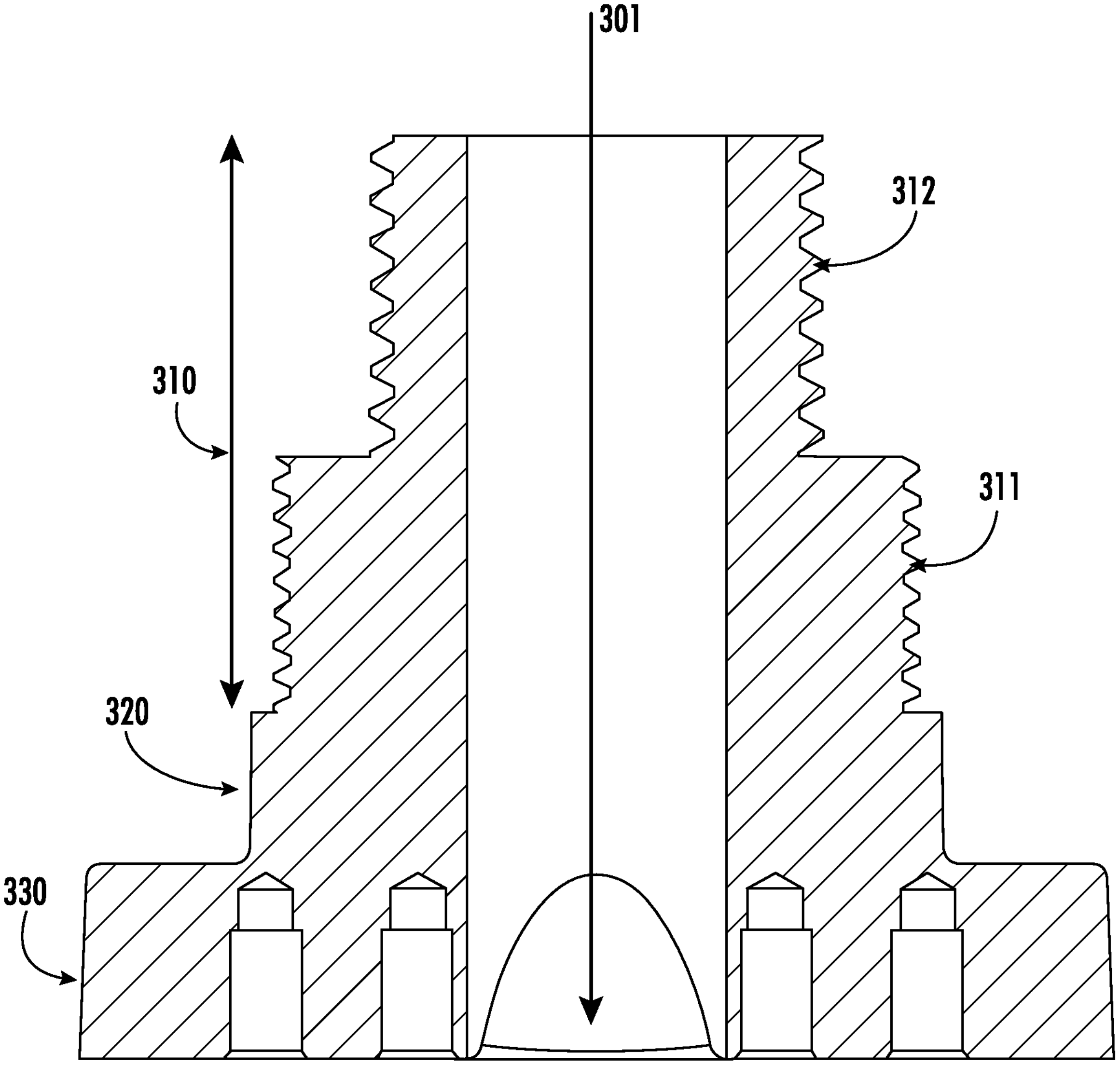
FIG. 4C is a cross-sectional view of the bottom connector illustrated in FIG. 4A taken along line 4+-+4, in accordance with certain embodiments of the present disclosure.
Figure 5A:
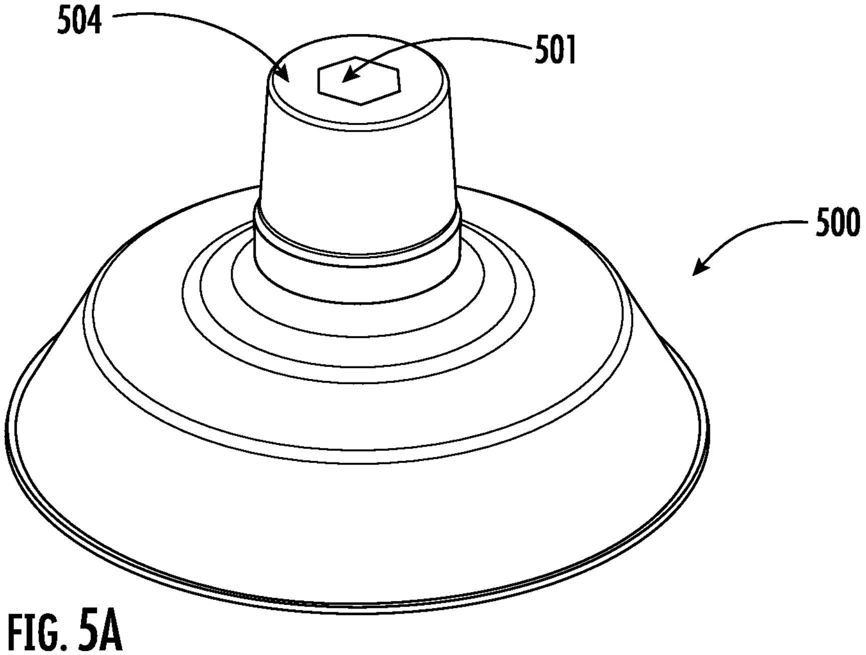
FIG. 5A is a perspective view of a light fixture shade, in accordance with certain embodiments of the present disclosure.
Figure 5B:
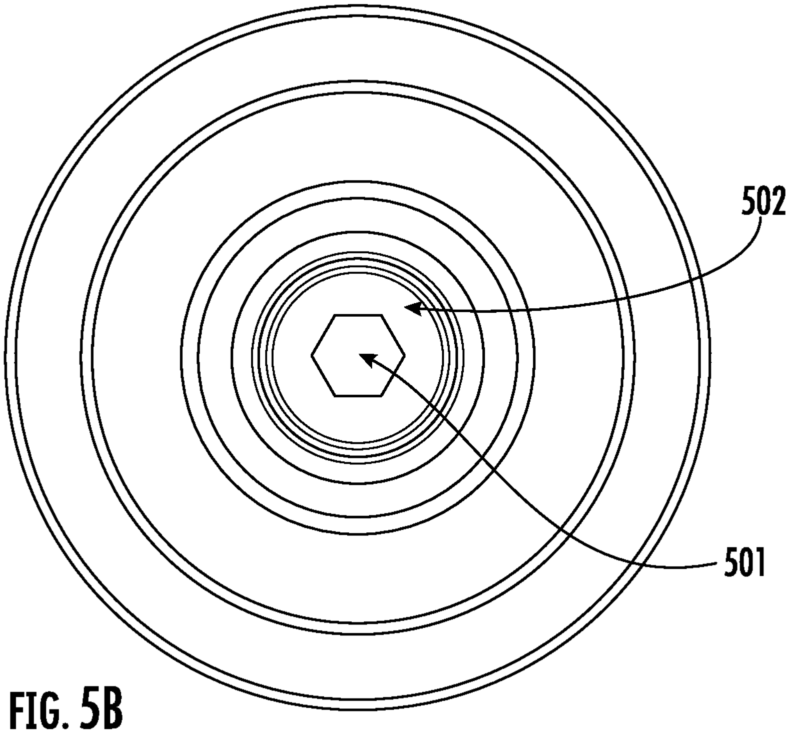
FIG. 5B is a bottom view of the light fixture shade illustrated in FIG. 5A, in accordance with certain embodiments of the present disclosure.

In certain embodiments, as illustrated in FIG. 4A-4C, the bottom-segment 311 and the top-segment 312 may have different diameters. The diameter of the top-segment 312 may correspond to the single-thread diameter 206 of the internal threaded-stem segment 205 of the stem 200 to facilitate the engagement of the bottom connector 300 with the stem 200. The diameter of the bottom-segment 311 may correspond to the diameter of the internal threaded-connector segment 701 of a top connector 700 to facilitate the engagement of the bottom connector 300 with the top connector 700. Accordingly, the bottom-segment 311 may engage an internal threaded-connector segment 701 of a top connector 700, and the top-segment 312 may engage the internal threaded-stem segment 205 of the stem 200.

In embodiment, the size and type of the threading for the bottom-segment 311 and the top-segment 312 may match. In some embodiments, where the bottom-segment 311 and the top-segment 312 have different diameters, the threading may be different. The threading of the bottom-segment 311 and the top-segment 312 may be in the same direction. In certain embodiments, the threading of the bottom-segment 311 and the top-segment 312 may be in opposite directions. The opposing direction of the threads may facilitate improved assembly of the connection assembly 100. Such an embodiment may allow for tighter engagement of the bottom connector 300 with the top connector 700 and with the stem 200.

In some embodiments, use of O-rings, gaskets, or the like may further improve the engagements. Referring to FIGS. 1C and 4B, an O-ring 104 may facilitate coupling of the top connector 700 with the light fixture shade 500. A rubber gasket 105 may facilitate coupling of the bottom connector 300 with the light fixture shade 500. The O-ring 104 and gasket 105 may facilitate this engagement by preventing unintentional rotation of components of the connection assembly 100.

The nut 320 of the bottom connector 300 may be located adjacent to the external threaded-connector segment 310. The nut 320 may have two external diameters. The first external-diameter 321 may be the distance between two diametrically opposite sides, and the second external-diameter 322 may be the distance between two diametrically opposite vertices. Accordingly, the first external-diameter 321 may be less than the second external-diameter 322. Various shapes may be suitable for the configuration of the nut 320, including hexagons, pentagons, squares, and other shapes known in the art. Such shapes may enable engagement of the nut 320 by a wrench, socket driver, pliers, or other torsional tool to effectuate threaded engagement of the bottom connector 300 with the stem 200. The nut 320 may be configured to engage an aperture 501 in the light fixture shade 500. The nut 320 may have a shape that corresponds to the shape of the aperture 501 in the light fixture shade 500.

The top-end portion 302 of the bottom connector 300 may pass through the aperture 501 in the light fixture shade 500, allowing engagement of the top-end portion 302 with the top connector 700 and the stem 200 above the light fixture shade 500.

The bottom ring 330 of the bottom connector 300 may be located adjacent to the nut 320. The bottom ring 330 may have a diameter greater than the second external-diameter 322 of the nut 320. The bottom ring 330 may have an upper surface 332 configured for coupling to an interior surface 502 of the light fixture shade 500 adjacent to the aperture 501. In some embodiments, this coupling may be direct, while in other embodiments the coupling may be indirect such as through the use of an intervening element such as a gasket 105. The bottom ring 330 may further have a bottom opening 333 configured to extend into a cavity 503 within the light fixture shade 500. In some embodiments, this bottom opening 333 may facilitate the passing of electrical components, such as wiring 106, through the bottom connector 300.

Figure 6:
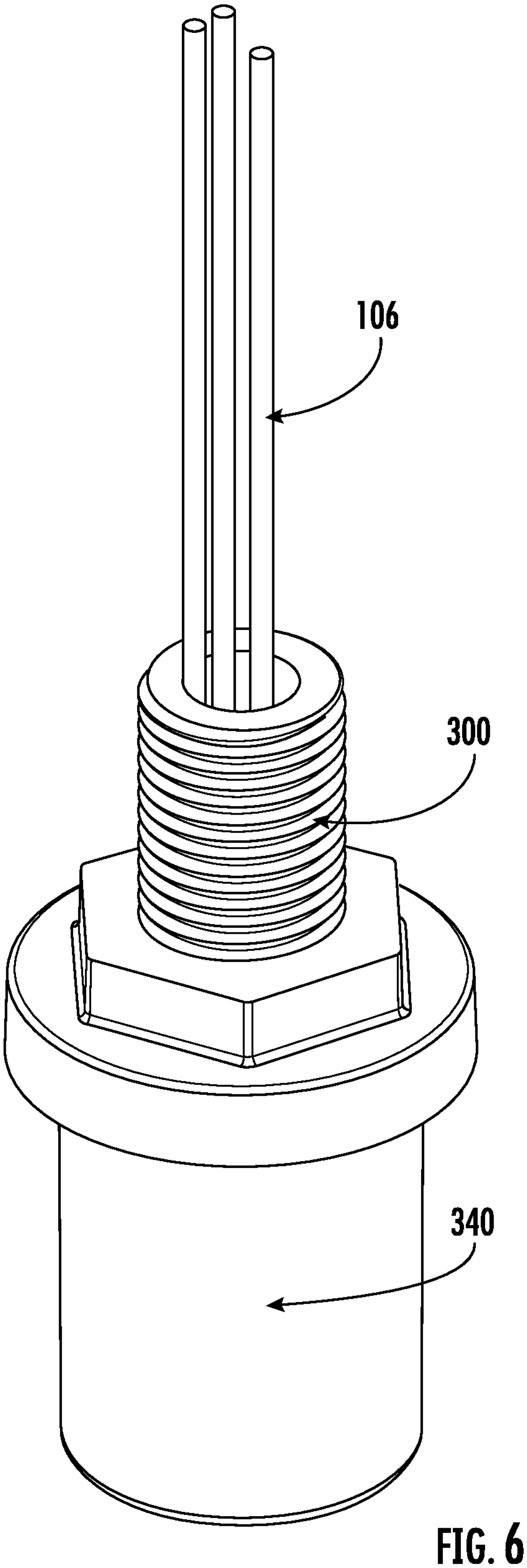
FIG. 6 is a bottom connector coupled to a housing adapted to receive electrical wiring, in accordance with certain embodiments of the present disclosure.

In some embodiments, the bottom connector 300 may have a bottom-end portion 303 adjacent to the bottom ring 330. As illustrated in FIG. 6, the bottom-end portion 303 may comprise a housing 340 defining a cylindrical cavity. The housing 340 may have a top-opening coupled to the bottom-opening 333 of the bottom ring 330. The housing 340 may be configured to receive electrical wiring 106 from the longitudinal stem-bore 201 of the stem 200. The electrical wiring 106 may be adapted to connect to a light source (not shown) within the cavity 503 of the light fixture shade 500.

Top Connector

Figure 7A:
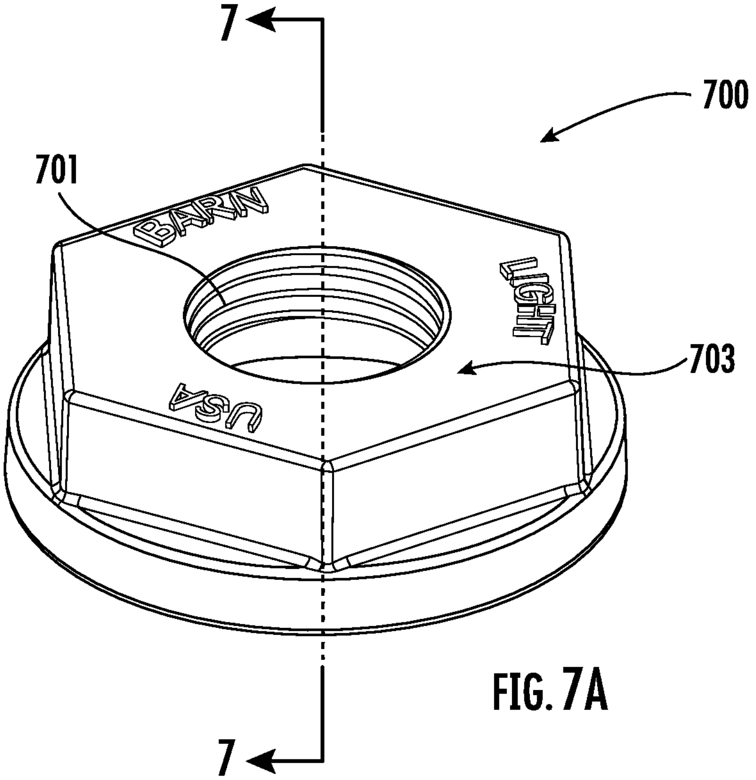
FIG. 7A is a perspective view of a top connector, in accordance with certain embodiments of the present disclosure.
Figure 7C:
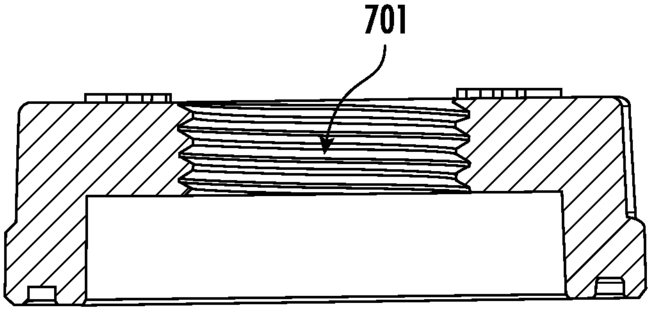
FIG. 7C is a cross-sectional view of the top connector illustrated in FIG. 7A taken along line 7+-+7, in accordance with certain embodiments of the present disclosure.
Figure 7B:
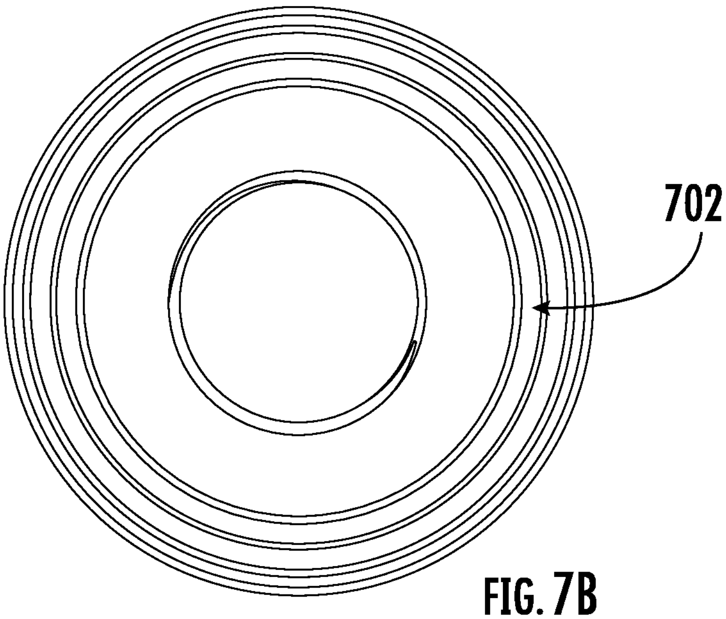
FIG. 7B is a bottom view of the top connector illustrated in FIG. 7A, in accordance with certain embodiments of the present disclosure.

Referring to FIGS. 7A-7C, a connection assembly 100 may include a top connector 700. In some embodiments, the top connector 700 may engage the bottom connecter 300. The top connector 700 may have an internal threaded-connector segment 701. The internal threaded-connector segment 701 may be configured to couple to at least a portion of the external threaded-connector segment 310 of the bottom connector 300, as illustrated in FIG. 1C. The top connector 700 may further include a bottom-side 702 configured for coupling to an exterior surface 504 of the light fixture shade 500 adjacent to the aperture 501 in the light fixture shade 500. In some embodiments, the coupling may be direct, while in other embodiments the coupling may be indirect such as through the use of an intervening element such as an O-ring 105. The top connector 700 may have a top-side 703 configured for coupling to the stem-opening 203 of the stem 200. In some embodiments, this coupling may be direct, while in other embodiments the coupling may be indirect such as through the use of an intervening element such as an O-ring or gasket.

Use of the Connection Assembly

In some embodiments, upon operative engagement of the stem 200 with the bottom connector 300, the longitudinal stem-bore 201 of the stem 200 and the longitudinal connector-bore 301 of the bottom connector 300 may define a hollow passage 101, as illustrated in FIG. 1C. Upon operative engagement of the top connector 700 with the bottom connector 300, a seal 102 may form between the top connector 700 and the light fixture shade 500. In some embodiments, enhancement of the seal 102 may occur with addition of an intervening component, such as an O-ring 104 or another component that would be obvious to one of ordinary skill in the art.

Figure 12:
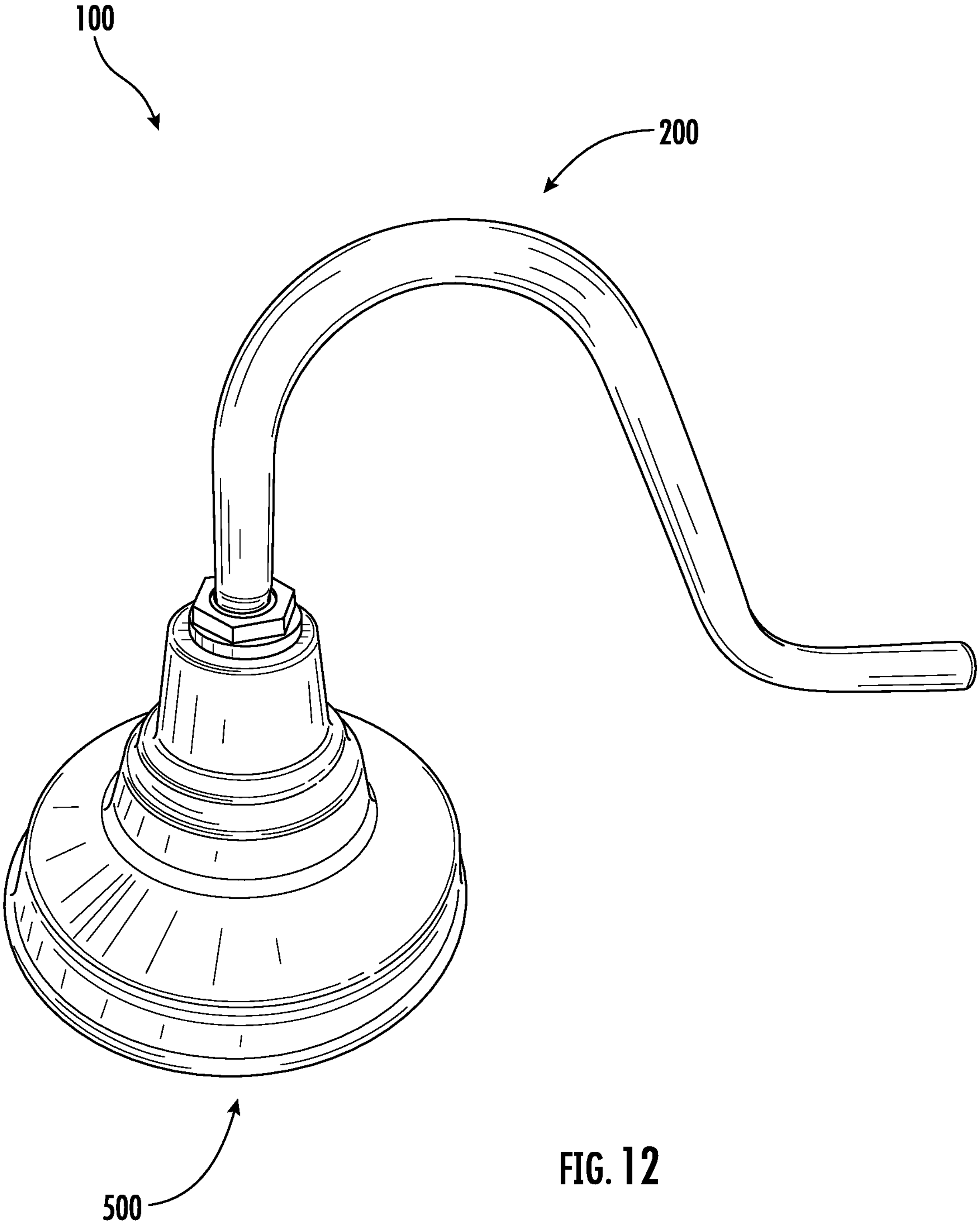
FIG. 12 is an illustration of a connection assembly with a stem segment having a gooseneck shape, in accordance with certain embodiments of the present disclosure.

In certain embodiments, the hollow passage 101 may be adapted to house electrical wiring 106, and the seal 102 may be adapted to reduce water-leakage into the hollow passage 101. In an embodiment, the electrical wiring 106 may be adapted to connect to a light source within the cavity 503 of the light fixture shade 500. In some embodiments, the light fixture shade 500 may be configured to enable projection of light from the light source in a downward direction. The stem 200 may be adapted for mounting such a downward facing light fixture shade 500. The connection assembly 100 may be adapted to mount the light fixture shade 500 on a ceiling (not shown) where the stem 200 has a tube or cylindrical shape (e.g., as illustrated in FIG. 1A) in a vertical position. The connection assembly 100 may be adapted to mount the light fixture shade 500 on a vertical wall (not shown) where the stem 200 has a stem-segment having a gooseneck shape, as illustrated in FIG. 12.

In certain embodiments, a bottom seal 103 may form between the bottom connector 300 and the light fixture shade 500, in addition to the seal 102 between the top connector 700 and the light fixture shade 500. In such embodiments, the seal 102 and the bottom seal 103 may be located adjacent to the aperture 501 in the light fixture shade 500. The seal 102 and the bottom seal 103 may clamp and support the light fixture shade 500. In some embodiments, an intervening component (such as an O-ring 104 or another component that would be obvious to one of ordinary skill in the art) may enhance the seal 102. An intervening component, such as a rubber gasket 105 or another component that would be obvious to one of ordinary skill in the art, may enhance the bottom seal 103. Such sealing mechanisms may further reduce water leakage in the hollow passage 101 and the housing 340 that contain the electrical wiring 106. Similar mechanisms may be implemented to seal the bottom-opening 333 of the bottom ring 330 with the housing 340 for the light source within the cavity 503 of the light fixture shade 500.

Alternative Connection Assembly

FIGS. 8-11 illustrate an alternative connection assembly 800 comprising the stem 200 described above, as well as two alternative connectors. An alternative top connector 900 may be configured to engage the stem 200 and an alternative bottom connector 1000, which may be configured to engage the alternative top connector 900. The alternative top connector 900 and the alternative bottom connector 1000 may couple, directly or indirectly, to the light fixture shade 500.

Alternative Top Connector

Referring to FIGS. 8C and 9A-9C, the alternative top connector 900 may have an external threaded-connector segment 901 configured to engage the internal threaded-stem segment 205 of the stem 200. The alternative top connector 900 also contains a bottom-side 902 configured to couple to the exterior surface 504 of the light fixture shade 500 adjacent to the aperture 501 in the light fixture shade 500. In some embodiments, this coupling may be direct, while in other embodiments the coupling may be indirect such as through the use of an intervening element such as an O-ring 104. The alternative top connector 900 may have an internal threaded-connector segment 903, which may be configured to engage an external threaded-connector segment 1010 of the alternative bottom connector 1000. In certain embodiments, the alternative connection assembly 800 may provide the benefit of an improved sealing mechanism from water leakage and additional protection for the electrical wiring 106.

In some embodiments, the alternative top connector 900 may contain a hollow-bore 904. The hollow-bore 904 may traverse an entire axial length of the alternative top connector 900. In an embodiment, the hollow-bore 904 may differ in width throughout. The internal threaded-connector segment 903 may traverse a portion of the hollow-bore 904. The top portion of the external threaded-connector segment 1010 of the alternative bottom connector 1000 may be configured to access the bottom portion of the hollow-bore 904 in order to facilitate the engagement of the external threaded-connector segment 1010 with the internal threaded-connector segment 903 of the alternative top connector 900. In certain embodiments, this engagement of the alternative top connector 900 housing a portion of the alternative bottom connector 1000 may provide the benefit of an improved sealing mechanism to reduce water leakage into the cavity 503 within the light fixture shade 500 and may provide additional protection for the electrical wiring 106 within the housing 1040.

Alternative Bottom Connector

Referring to FIGS. 10A-10D, the alternative bottom connector 1000 may have a top-end portion 1002, a nut 1020, and a bottom ring 1030. As described in the preceding paragraph, the alternative bottom connector 1000 may be configured to engage the alternative top connector 900. The alternative bottom connector 1000 may comprise a longitudinal connector-bore 1001, which may traverse an entire axial-length of the alternative bottom connector 1000. An external surface of the alternative top-end portion 1002 may comprise an external threaded-connector segment 1010.

Referring back to FIG. 8C, the external threaded-connector segment 1010 of the alternative bottom connector 1000 may engage the internal threaded-connector segment 903 of the alternative top connector 900. The threading of the external threaded-connector segment 1010 of the alternative bottom connector 1000 and the internal threaded-connector-segment 903 of the alternative top connector 900 may be in the same direction, or in a different direction, as the threading of the internal threaded-stem segment 205 of the stem 200 and the external threaded-connector segment 901 of the alternative top connector 900. The opposing direction of the threads may facilitate improved assembly of the connection assembly 800. Such an embodiment may allow for a tighter engagement of the alternative bottom connector 1000 with the alternative top connector 900, and a tighter engagement of the alternative top connector 900 with the stem 200.

Figure 8B:
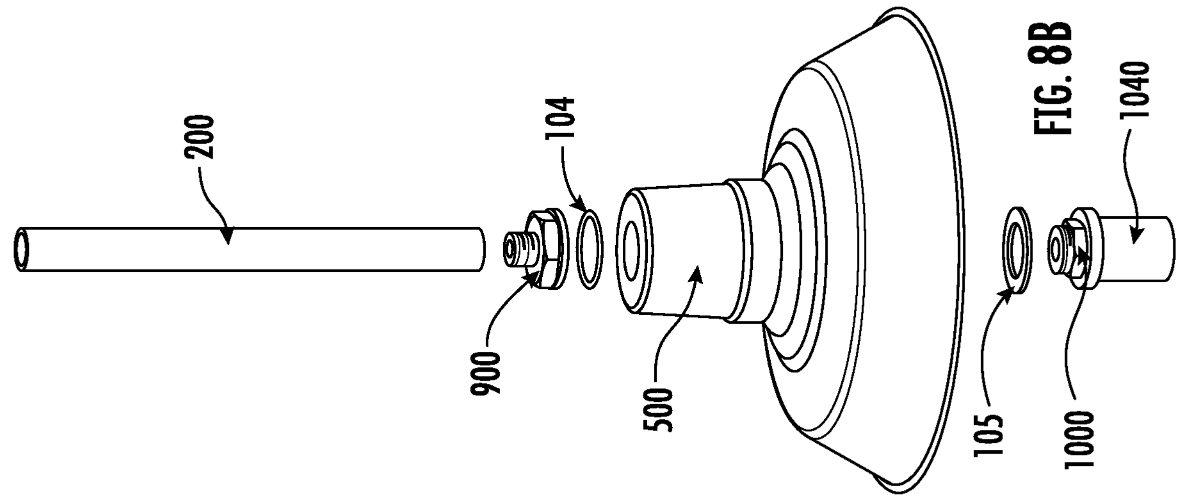
FIG. 8B is an exploded view of the alternative connection assembly illustrated in FIG. 8A, in accordance with certain embodiments of the present disclosure.
Figure 8A:
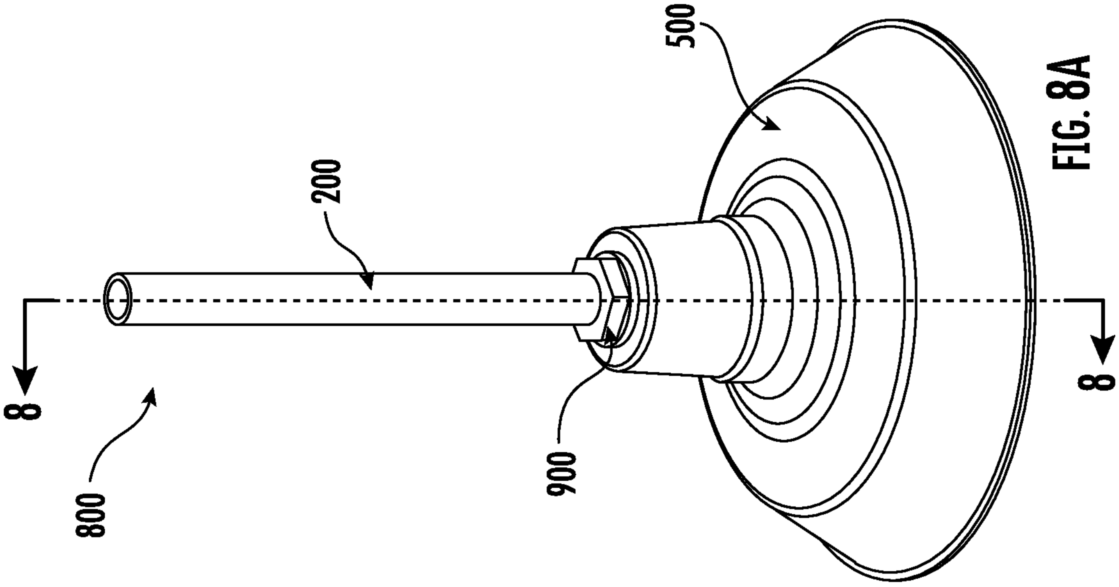
FIG. 8A is a perspective view of an alternative connection assembly, in accordance with certain embodiments of the present disclosure.
Figure 8C:
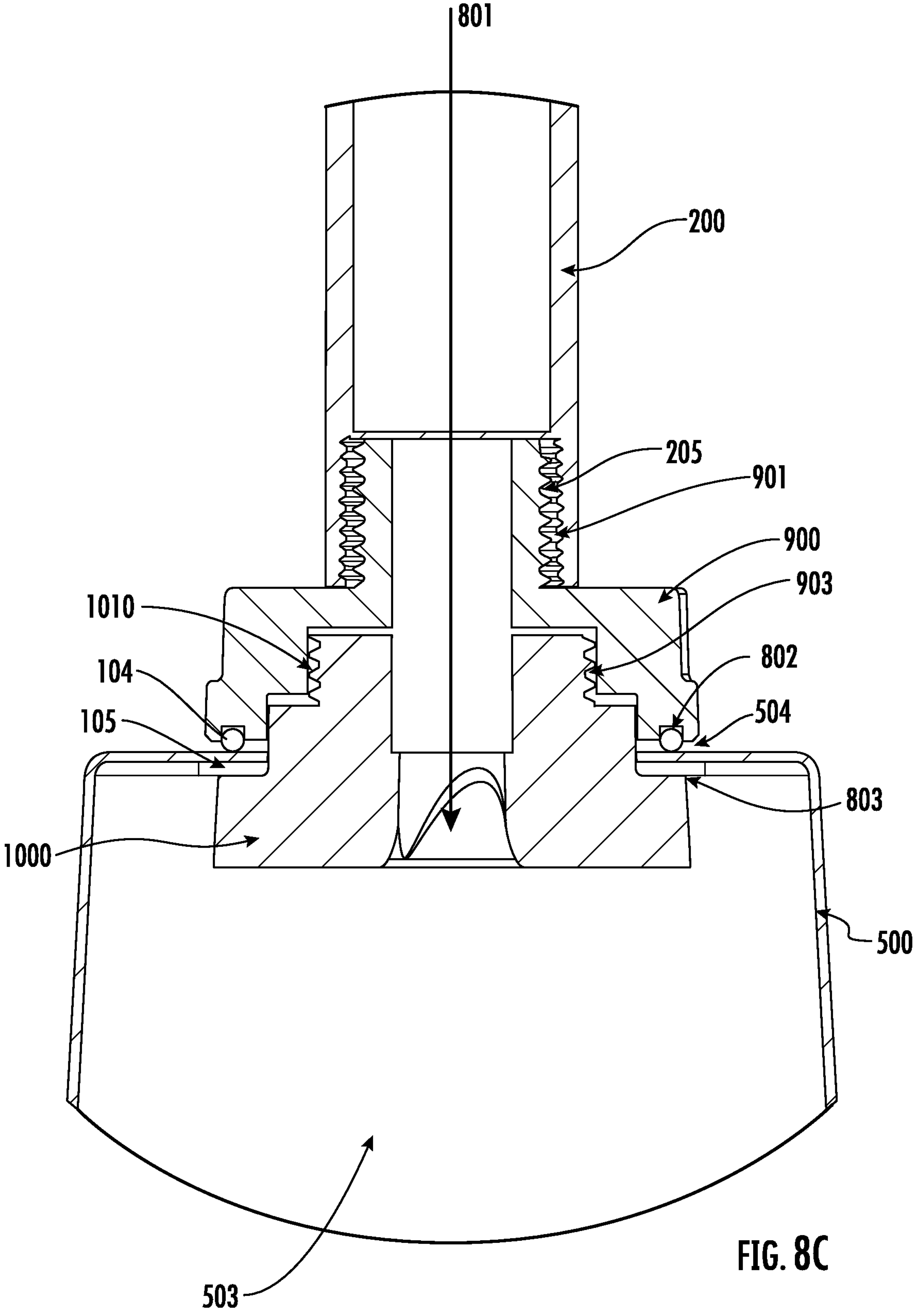
FIG. 8C is a cross-sectional view of a section of the alternative connection assembly illustrated in FIG. 8A taken along line 8+-+8 showing the coupling of the stem and the alternative connectors, in accordance with certain embodiments of the present disclosure.
Figure 9A:
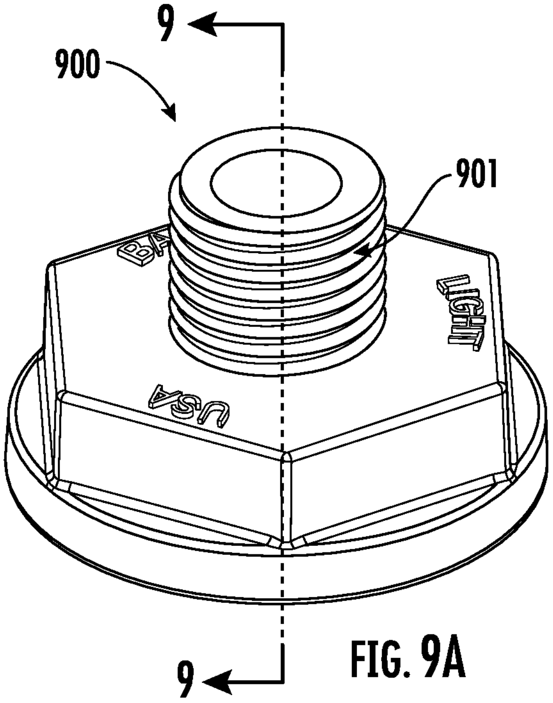
FIG. 9A is a perspective view of an alternative top connector, in accordance with certain embodiments of the present disclosure.
Figure 9B:
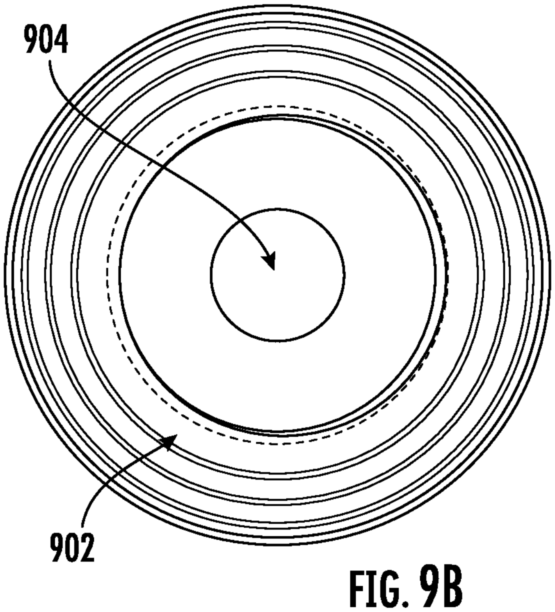
FIG. 9B is a bottom view of the alternative top connector illustrated in FIG. 9A, in accordance with certain embodiments of the present disclosure.
Figure 9C:
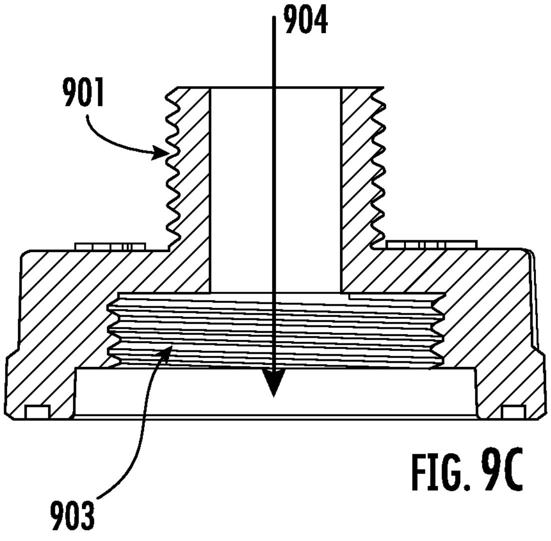
FIG. 9C is a cross-sectional view of the alternative top connector illustrated in FIG. 9A taken along line 9+-+9, in accordance with certain embodiments of the present disclosure.
Figure 10D:
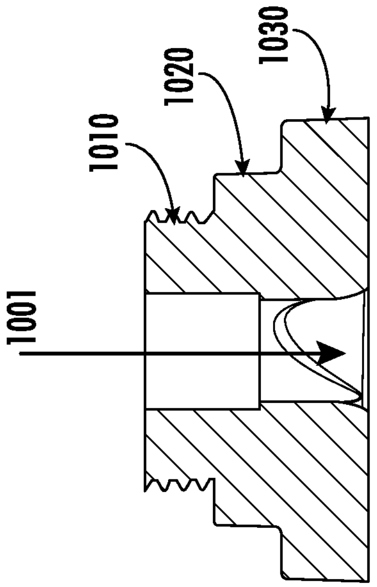
FIG. 10D is a cross-sectional view of an alternative bottom connector illustrated in FIG. 10A taken along line 10+-+10, in accordance with certain embodiments of the present disclosure.
Figure 10C:
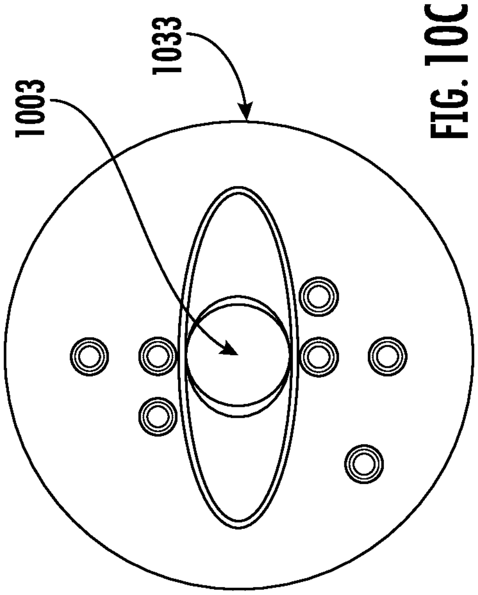
FIG. 10C is a bottom view of an alternative bottom connector illustrated in FIG. 10A, in accordance with certain embodiments of the present disclosure.
Figure 10A:
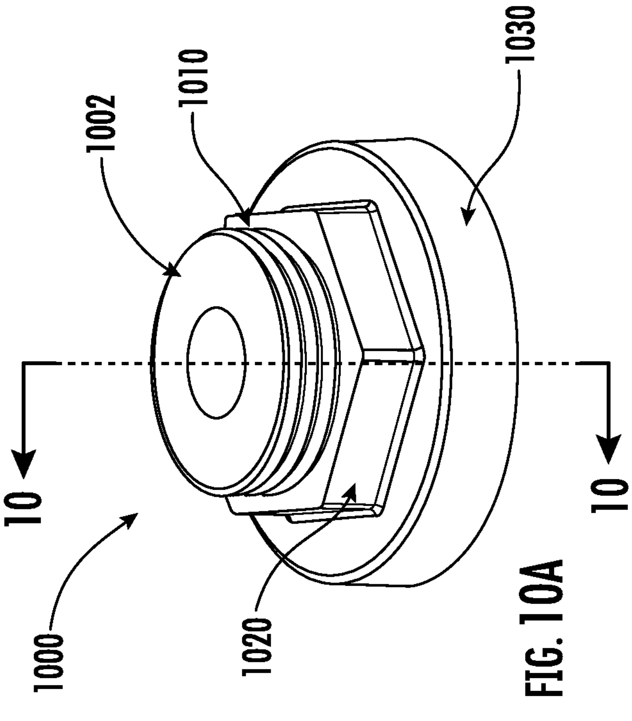
FIG. 10A is a perspective view of an alternative bottom connector, in accordance with certain embodiments of the present disclosure.
Figure 10B:
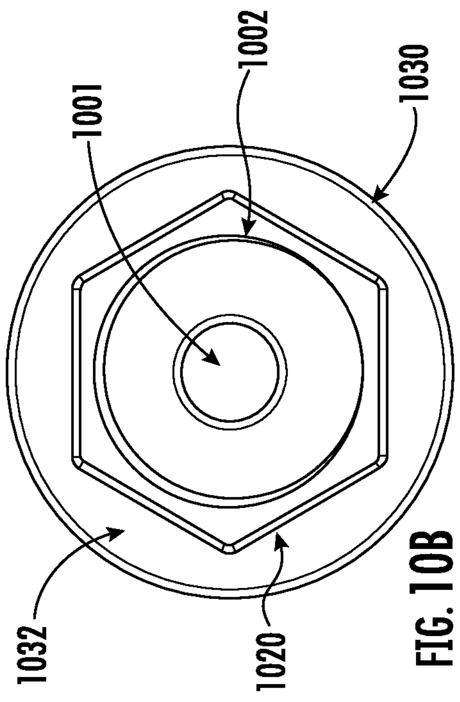
FIG. 10B is a top view of the alternative bottom connector illustrated in FIG. 10A, in accordance with certain embodiments of the present disclosure.

In some embodiments, use of O-rings, gaskets, or the like may further improve the engagements. Referring to FIG. 8C, an O-ring 104 may facilitate coupling of the alternative top connector 1000 with the light fixture shade 500. A rubber gasket 105 may facilitate coupling of the alternative bottom connector 900 with the light fixture shade 500. The O-ring 104 and the gasket 105 may facilitate this engagement by preventing unintentional rotation of the components of the alternative connection assembly 800.

The nut 1020 of the alternative bottom connector 1000 may be located adjacent to the external threaded-connector segment 1010. The nut 1020 may have various shapes and two external diameters, similar to the first external-diameter 321 and the second external-diameter 322 described above. Such shapes may enable engagement of the nut 1020 by a wrench, socket driver, pliers, or other torsional tool to effectuate threaded engagement of the alternative bottom connector 1000 with the alternative top connector 900. The nut 1020 may be configured to engage the aperture 501 in the light fixture shade 500. The nut 1020 may have a shape that corresponds to the shape of the aperture 501 in the light fixture shade 500. The top-end portion 1002 of the bottom connector 1000 may pass through the aperture 501 in the light fixture shade 500, allowing engagement of the top-end portion 1002 with the alternative top connector 900 above the light fixture shade 500.

The bottom ring 1030 of the alternative bottom connector 1000 may be located adjacent to the nut 1020. The bottom ring 1030 may have a diameter greater than the larger of the two external diameters of the nut 1020. The bottom ring 1030 may have an upper surface 1032 configured for coupling to the interior surface 502 of the light fixture shade 500 adjacent to the aperture 501 in the light fixture shade 500. In some embodiments, the coupling may be direct, while in other embodiments the coupling may be indirect such as through the use of an intervening element such as a gasket 105. The bottom ring 1030 may have a bottom opening 1033 configured to extend into the cavity 503 within the light fixture shade 500. In some embodiments, this bottom opening 1033 may facilitate the passing of electrical components, such as electrical wiring 106, through the alternative bottom connector 1030.

Figure 11:
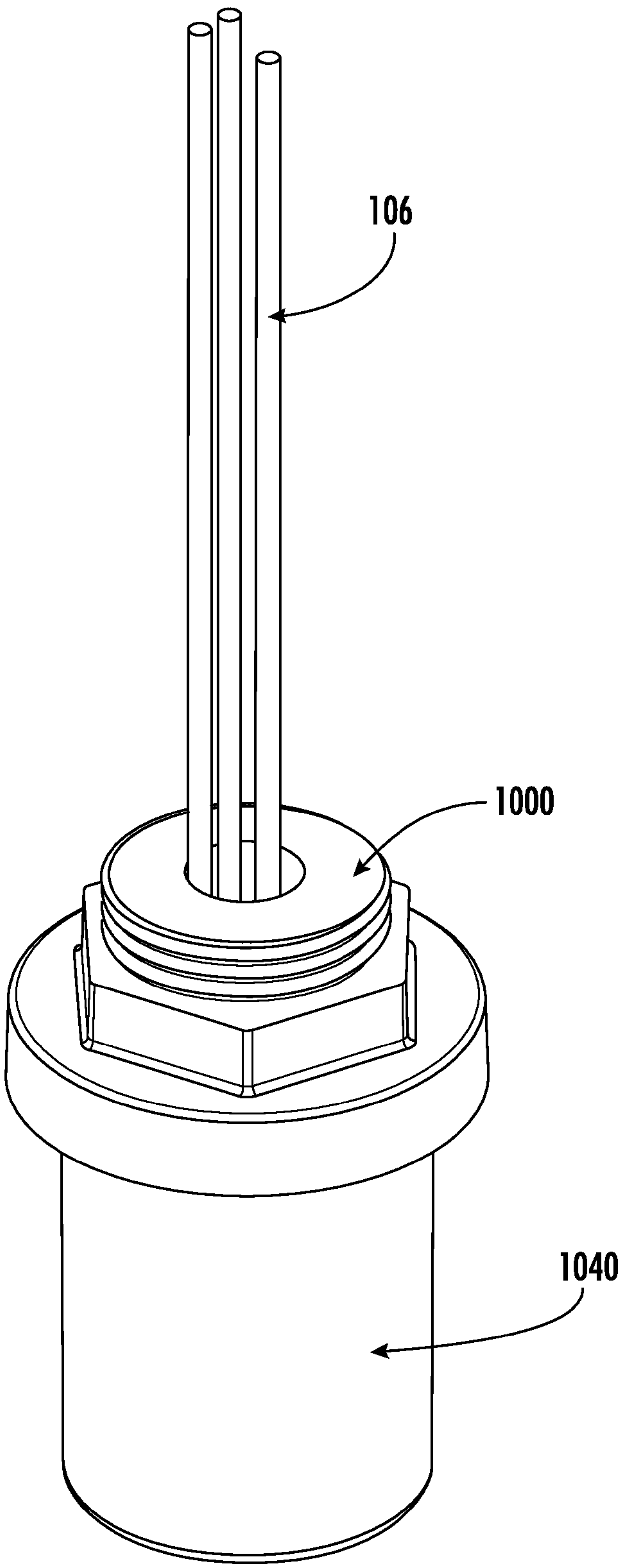
FIG. 11 is a bottom alternative connector coupled to a housing adapted to receive electrical wiring, in accordance with certain embodiments of the present disclosure.

In some embodiments, the alternative bottom connector 1000 may have a bottom-end portion 1003 adjacent to the bottom ring 1030. As illustrated in FIG. 11, the bottom-end portion 1003 may comprise a housing 1040 defining a cylindrical cavity. The housing 1040 may have a top-opening coupled to the bottom-opening 1033 of the bottom ring 1030. The housing 1040 may be configured to receive electrical wiring 106 from the longitudinal stem-bore 201 of the stem 200. The electrical wiring 106 may be adapted to connect to a light source (not shown) within the cavity 503 of the light fixture shade 500.

Use of the Alternative Connection Assembly

In some embodiments, upon operative engagement of the stem 200 with the alternative top connector 900 and the operative engagement of the alternative top connector 900 with the alternative bottom connector 1000, a hollow passage 801 is defined as illustrated in FIG. 8C by the longitudinal stem-bore 201 of the stem 200, the hollow-bore 904 of the alternative top connector 900, and the longitudinal connector-bore 1001 of the alternative bottom connector 1000. Upon operative engagement of the alternative top connector 900 with the alternative bottom connector 1000, a seal 802 may form between the alternative top connector 900 and the light fixture shade 500. In some embodiments, enhancement of the seal 802 may occur with addition of an intervening component, such as an O-ring, gasket, or another component that would be obvious to one of ordinary skill in the art.

In some embodiments, the hollow passage 801 may be adapted to house electrical wiring 106, and the seal 802 may be adapted to reduce water-leakage into the hollow passage 801. In an embodiment, the bottom-opening 1033 of the bottom ring 1030 of the alternative bottom connector 1000 may be configured to receive electrical wiring 106 adapted to connect to a light source (not shown). In some embodiments, the cavity 503 within the light fixture shade 500 may be adapted to house the light source. The light fixture shade 500 may be configured to enable projection of light from the light source in a downward direction. The stem 200 may be adapted for mounting such a downward facing light fixture shade 500. The alternative connection assembly 800 may be adapted to mount the light fixture shade 500 on a ceiling (not shown) where the stem 200 has a tube or cylindrical shape (e.g., as illustrated in FIG. 8A) in a vertical position. The alternative connection assembly 800 may be adapted to mount the light fixture shade 500 on a vertical wall (not shown) where the stem 200 has a stem-segment having a gooseneck shape, as illustrated in FIG. 12.

In certain embodiments, a bottom seal 803 may form between the alternative bottom connector 1000 and the light fixture shade 500, in addition to the seal 802 between the alternative top connector 900 and the light fixture shade 500. In such embodiments, the seal 802 and the bottom seal 803 may be located adjacent to the aperture 501 in the light fixture shade 500. The seal 802 and the bottom seal 803 may clamp and support the light fixture shade 500. In some embodiments, an intervening component (such as an O-ring 104 or another component that would be obvious to one of ordinary skill in the art) may enhance the seal 802. An intervening component, such as a rubber gasket 105 or another component that would be obvious to one of ordinary skill in the art, may enhance the bottom seal 803. Such sealing mechanisms may further reduce water leakage in the hollow passage 801 and the housing 1040 that contain the electrical wiring 106. Similar mechanisms may be implemented to seal the bottom-opening 1033 of the bottom ring 1030 with the housing 1040 for the light source within the cavity 503 of the light fixture shade 500.

While the present disclosure has been particularly shown and described with reference to an embodiment thereof, it will be understood by those skilled in the art that various changes in form and details may be made therein without departing from the spirit and scope of the present disclosure. Although some embodiments are specifically mentioned, others will be apparent to those of ordinary skill in the art and so do not present an exhaustive list of alternatives.

What is claimed is:

1. A connection assembly, comprising:

a stem having a longitudinal stem-bore, an end-portion of the stem defining a stem-opening extending from the longitudinal stem-bore, the end-portion of the stem comprising a cylindrical wall having an internal threaded-stem segment traversing a portion of the longitudinal stem-bore, the internal threaded-stem segment having a single-thread diameter;

a bottom connector configured to engage the stem, the bottom connector having a top-end portion, the bottom connector comprising:

a longitudinal connector-bore traversing an entire axial-length of the bottom connector;

an external threaded-connector segment, the external threaded-connector segment comprising an external surface of the top-end portion of the bottom connector, the external threaded-connector segment of the bottom connector configured to engage the internal threaded-stem segment of the stem;

a nut formed adjacent to the external threaded-connector segment of the bottom connector, the nut having a first external-diameter and a second external-diameter, the first external-diameter less than the second external-diameter, the nut configured to engage an aperture in a light fixture shade, the nut having a nut-shape corresponding to an aperture-shape of the aperture in the light fixture shade; and, a bottom ring formed adjacent to the nut, the bottom ring having a ring-diameter greater than the second external-diameter of the nut, an upper-surface of the bottom ring configured to be coupled to an interior surface of the light fixture shade adjacent to the aperture in the light fixture shade, the bottom ring having a bottom-opening configured to extend to a cavity within the light fixture shade;

a top connector configured to engage the bottom connector, the top connector having an internal threaded-connector segment configured to engage at least a portion of the external threaded-connector segment of the bottom connector, a bottom-side of the top connector configured to be coupled to an exterior surface of the light fixture shade adjacent to the aperture in the light fixture shade; and, wherein either:

(a) the external threaded-connector segment of the bottom connector comprises a bottom-segment and a top-segment, the bottom-segment and the top-segment having different diameters, wherein the bottom-segment of the external threaded-connector segment is configured to engage the internal threaded-connector segment of the top connector, and wherein the top-segment of the external threaded-connector segment is configured to engage the internal threaded-stem segment of the stem; or (b) the external threaded-connector segment of the bottom connector has a single-thread diameter, the internal threaded-connector segment of the top connector having a diameter equal to the single-thread diameter of the internal threaded-stem segment.

2. The connection assembly of claim 1, wherein the longitudinal stem-bore of the stem and the longitudinal connector-bore of the bottom connector define a hollow passage, when the stem engages the bottom connector.

3. The connection assembly of claim 2, further comprising:

a seal between the top connector and the light fixture shade, when the top connector engages the bottom connector.

4. The connection assembly of claim 3, wherein the hollow passage is adapted to house electrical wiring, the seal adapted to reduce water-leakage into the hollow passage, the bottom-opening of the bottom ring configured to receive the electrical wiring, the electrical wiring adapted to connect to a light source, the cavity within the light fixture shade adapted to house the light source.

5. The connection assembly of claim 4, wherein the light fixture shade is configured to project light from the light source in a downward direction.

6. The connection assembly of claim 5, wherein the stem is adapted to be mounted on a ceiling, the stem having a cylindrical shape.

7. The connection assembly of claim 5, wherein the stem is adapted to be mounted on a wall, the stem comprising a stem-segment having a gooseneck shape.

8. The connection assembly of claim 3, further comprising:

a bottom seal between the bottom connector and the light fixture shade, the seal and the bottom seal located adjacent to the aperture in the light fixture shade, the two seals adapted to clamp and support the light fixture shade.

9. The connection assembly of claim 1, wherein the external threaded-connector segment of the bottom connector having the single-thread diameter comprises:

a bottom-segment configured to engage the internal threaded-connector segment of the top connector; and, a top-segment configured to engage the internal threaded-stem segment of the stem.

10. The connection assembly of claim 1, wherein the bottom connector further comprises a bottom-end portion adjacent to the bottom ring, the bottom-end portion of the bottom connector having a housing defining a cylindrical cavity, the housing having a top-opening coupled to the bottom-opening of the bottom ring, the housing configured to receive electrical wiring from the longitudinal stem-bore of the stem, the electrical wiring adapted to connect to a light source, the cavity within the light fixture shade adapted to house the light source.

11. A connection assembly, comprising:

a stem having a longitudinal stem-bore, an end-portion of the stem defining a stem-opening extending from the longitudinal stem-bore, the end-portion of the stem comprising a cylindrical wall having an internal threaded-stem segment traversing a portion of the longitudinal stem-bore, the internal threaded-stem segment having a single-thread diameter;

a top connector configured to engage the stem, the top connector having an external threaded-connector segment configured to engage the internal threaded-stem segment of the stem, a bottom-side of the top connector configured to be coupled to an exterior surface of a light fixture shade adjacent to an aperture in the light fixture shade, the top connector having an internal threaded-connector segment; and, a bottom connector configured to engage the top connector, the bottom connector having a top-end portion, wherein the bottom connector comprises:

a longitudinal connector-bore traversing an entire axial-length of the bottom connector;

an external threaded-connector segment, the external threaded-connector segment comprising an external surface of the top-end portion of the bottom connector, the external threaded-connector segment of the bottom connector configured to engage the internal threaded-connector segment of the top connector;

a nut formed adjacent to the external threaded-connector segment of the bottom connector, the nut having a first external-diameter and a second external-diameter, the first external-diameter less than the second external-diameter, the nut configured to engage the aperture in the light fixture shade, the nut having a nut-shape corresponding to an aperture-shape of the aperture in the light fixture shade; and, a bottom ring formed adjacent to the nut, the bottom ring having a ring-diameter greater than the second external-diameter of the nut, an upper-surface of the bottom ring configured to be coupled to an interior surface of the light fixture shade adjacent to the aperture in the light fixture shade, the bottom ring having a bottom-opening configured to extend to a cavity within the light fixture shade;

a seal between the top connector and the light fixture shade, when the top connector engages the bottom connector;

wherein the longitudinal stem-bore of the stem and the longitudinal connector-bore of the bottom connector define a hollow passage, when the stem engages the bottom connector;

wherein the hollow passage is adapted to house electrical wiring, the seal adapted to reduce water-leakage into the hollow passage, the bottom-opening of the bottom ring configured to receive the electrical wiring, the electrical wiring adapted to connect to a light source, the cavity within the light fixture shade adapted to house the light source;

wherein the light fixture shade is configured to project light from the light source in a downward direction; and, wherein either:

(a) the stem is adapted to be mounted on a ceiling, the stem having a cylindrical shape; or (b) the stem is adapted to be mounted on a wall, the stem comprising a stem-segment having a gooseneck shape.

12. The connection assembly of claim 11, wherein the top connector comprises a hollow-bore, the hollow-bore traversing an entire axial length of the top connector, the internal threaded-connector segment of the top connector traversing a portion of the hollow-bore, the external threaded-connector segment of the bottom connector configured to access said portion of the hollow-bore of the top connector.

13. The connection assembly of claim 12, wherein the longitudinal stem-bore of the stem, the hollow-bore of the top connector and the longitudinal connector-bore of the bottom connector define a hollow passage, when the stem engages the top connector and the top connector engages the bottom connector.

14. A connection assembly, comprising:

a stem having a longitudinal stem-bore, an end-portion of the stem defining a stem-opening extending from the longitudinal stem-bore, the end-portion of the stem comprising a cylindrical wall having an internal threaded-stem segment traversing a portion of the longitudinal stem-bore, the internal threaded-stem segment having a single-thread diameter;

a bottom connector configured to engage the stem, the bottom connector having a top-end portion, the bottom connector comprising:

a longitudinal connector-bore traversing an entire axial-length of the bottom connector;

an external threaded-connector segment, the external threaded-connector segment comprising an external surface of the top-end portion of the bottom connector, the external threaded-connector segment of the bottom connector configured to engage the internal threaded-stem segment of the stem;

a nut formed adjacent to the external threaded-connector segment of the bottom connector, the nut having a first external-diameter and a second external-diameter, the first external-diameter less than the second external-diameter, the nut configured to engage an aperture in a light fixture shade, the nut having a nut-shape corresponding to an aperture-shape of the aperture in the light fixture shade; and, a bottom ring formed adjacent to the nut, the bottom ring having a ring-diameter greater than the second external-diameter of the nut, an upper-surface of the bottom ring configured to be coupled to an interior surface of the light fixture shade adjacent to the aperture in the light fixture shade, the bottom ring having a bottom-opening configured to extend to a cavity within the light fixture shade;

a top connector configured to engage the bottom connector, the top connector having an internal threaded-connector segment configured to engage at least a portion of the external threaded-connector segment of the bottom connector, a bottom-side of the top connector configured to be coupled to an exterior surface of the light fixture shade adjacent to the aperture in the light fixture shade;

a seal between the top connector and the light fixture shade, when the top connector engages the bottom connector;

wherein the longitudinal stem-bore of the stem and the longitudinal connector-bore of the bottom connector define a hollow passage, when the stem engages the bottom connector;

wherein the hollow passage is adapted to house electrical wiring, the seal adapted to reduce water-leakage into the hollow passage, the bottom-opening of the bottom ring configured to receive the electrical wiring, the electrical wiring adapted to connect to a light source, the cavity within the light fixture shade adapted to house the light source;

wherein the light fixture shade is configured to project light from the light source in a downward direction; and, wherein either:

(a) the stem is adapted to be mounted on a ceiling, the stem having a cylindrical shape; or (b) the stem is adapted to be mounted on a wall, the stem comprising a stem-segment having a gooseneck shape.

* * * * *